April 15, 1952   C. R. WAGNER   2,592,625
PRODUCTION OF ALKYL QUINOLINES AND ALKENYL QUINOLINES
Filed June 14, 1949
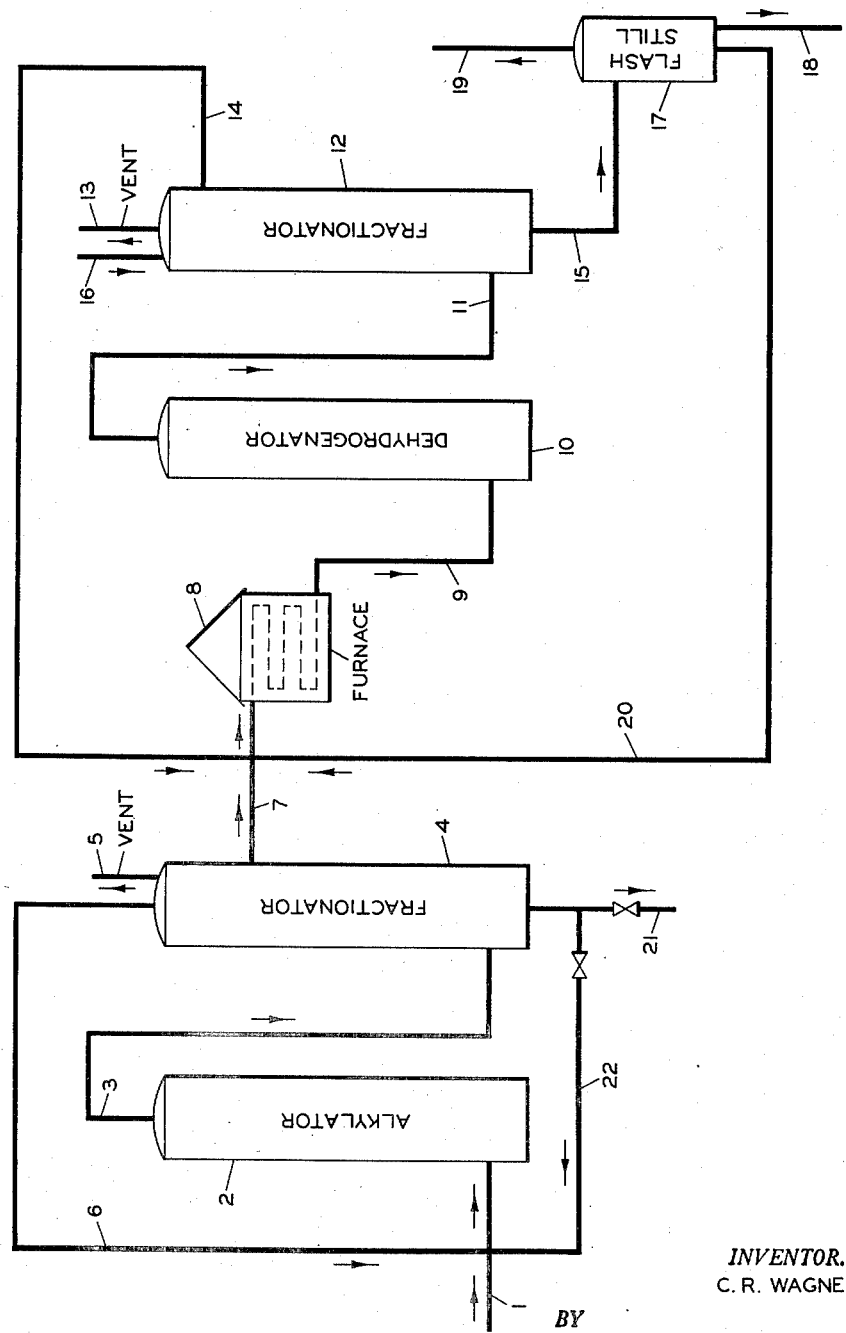
INVENTOR.
C. R. WAGNER
BY
Hudson & Young
ATTORNEYS

Patented Apr. 15, 1952

2,592,625

UNITED STATES PATENT OFFICE 2,592,625

PRODUCTION OF ALKYL QUINOLINES AND ALKENYL QUINOLINES

Cary R. Wagner, Utica, Ohio, assignor to Phillips Petroleum Company, a corporation of Delaware Application June 14, 1949, Serial No. 98,977

16 Claims. (Cl. 260—283)

The present invention relates to the production of alkylated quinolines and derivatives thereof. In one of its specific aspects it relates to the direct alkylation of a quinoline or alkyl quinoline with an olefin in the presence of a silica-alumina type solid contact catalyst. Another of its specific aspects pertains to dehydrogenation of the resulting alkyl quinoline to form the corresponding alkenyl quinoline. In a preferred form the invention relates to the production of 2-vinylquinoline by ethylation of quinoline to produce 2-ethylquinoline and dehydrogenation of same to form 2-vinylquinoline. The invention also pertains to a continuous process for the production of alkenyl quinoline from quinoline and olefins.

2 - Vinylquinoline or alpha-vinylquinoline, as well as 2-ethylquinoline or alpha-ethylquinoline, are known compounds. 2-Vinylquinoline has been obtained in small amounts from the reaction of the hydrobromide of beta-bromo-beta-(2-quinolyl)-propionic acid and boiling concentrated potassium carbonate solution (Einhorn and Lehnkering, Annalen, 1894, vol. 246, page 172). It has also been obtained by heating 2-(beta-hydroxyethyl)-quinoline with fuming hydrochloric acid and acetic acid at 150° to 160° C. (Methner, Berichte, 1894, vol. 27, page 2691). It is a liquid that is reported to be volatile with steam. A known homologue of 2-vinylquinoline is 2-propenylquinoline (alpha-propenylquinoline), which is reported to boil at 249° to 253° C.

2 - Ethylquinoline (alpha-ethylquinoline) has been obtained together with 4-ethylquinoline by heating N-ethylquinolinium iodide at 280° to 290° C. (Reher, Berichte, 1886, vol. 19, page 2996). It has also been obtained by the distillation of 2-ethylquinoline-4-carboxylic acid with soda lime (Doebner, Annalen, 1887, vol. 242, page 272). The boiling range of 2-ethylquinoline is reported to be 256.6° to 258.6° C.

The isomeric 3-ethylquinoline (beta-ethylquinoline) and 4-ethylquinoline (gamma-ethylquinoline) are known. 4-Ethylquinoline is a liquid whose boiling range is reported as 271° to 274° C., 134° C. at a pressure of 9 mm. of mercury, and 143° to 145° C. at a pressure of 8 to 9 mm. of mercury. It has been prepared together with 2-ethylquinoline, as stated hereinabove, by heating N-ethylquinolinium iodide at 280° to 290° C. (Reher., loc. cit.; see also Blaise and Maire, Compt. rend., 1907, vol. 144, page 94; Bulletin, 1908, series 4, vol. 3, page 659). 4-Ethylquinoline has also been prepared by the action of 1 molecular proportion of ethyl beta-chloroethyl ketone with 2 molecular proportions of aniline and 1 molecular proportion of aniline hydrochloride in absolute alcohol on the water bath and also by heating ethyl beta-anilinoethyl ketone and aniline hydrochloride in absolute alcohol on the water bath (Blaise and Marie, Compt. rend., 1907, vol. 144, pages 93 and 94; Bulletin 1908, series 4, vol. 3, pages 662, 665 and 667). 4-Ethylquinoline has also been obtained by heating 2-chloro-4-ethylquinoline with hydroiodic acid (sp. gr. 1.7) and red phosphorus in the presence of potassium iodide (Wohnlich, Archiv de pharmacie, vol. 251, page 543). It has also been obtained as one of the products resulting from the treatment of 4-cyanoquinoline with ethyl magnesium iodide in ether (Rabe and Pasternack, Berichte, 1913, vol. 46, page 1032). Other C-alkylquinolines which are known are 2-propylquinoline (alpha-propylquinoline), 4-propylquinoline, 2-isopropylquinoline, 3-isopropylquinoline, 4-isopropylquinoline, 7-isopropylquinoline, an isopropylquinoline of undeterminate constitution obtained by heating isopropyl alcohol with quinoline hydrochloride at 160° C., and 2-isobutylquinoline.

An object of this invention is to produce alkyl quinolines.

Another object is of this invention is to produce alkenyl quinolines.

It is a further object of the present invention to provide an improved process for the production of 2-vinylquinoline and its homologues and isomers.

A further object of the present invention is to provide a process for the production of alkenylquinolines from olefins and quinoline.

A further object of the invention is to provide a process for the production of alkyl-substituted quinolines from an olefin and quinoline and dehydrogenation of the alkyl-substituted quinolines to alkenyl-substituted quinolines.

It is another object of the present invention to provide a continuous process for the production of alkenylquinolines from olefins and quinoline or an alkyl quinoline which involves the alkylation of quinoline or an alkyl quinoline with an olefin and hydrogenation of the resulting alkylquinoline.

Yet another object is to effect alkylation of quinoline with an olefin under conditions which are ineffective for the alkylation of pyridine.

A further object is to employ for the alkylation of quinoline catalysts which do not effect alkylation of pyridine.

Other objects and advantages of the invention, some of which are referred to specifically hereinafter, will be apparent to those skilled in art to which the invention pertains.

According to one embodiment of the present invention, alkenylquinolines are produced from quinoline and an olefin by alkylation of quinoline (or an alkyl quinoline) with an olefin and dehydrogenation of the resulting alkylquinoline. 2-Vinylquinoline is produced, for example, by alkylation of quinoline with ethylene to produce 2-ethylquinoline, which is thereafter dehydrogenated to 2-vinylquinoline. The process is preferably conducted in a continuous manner as hereinafter more specifically described. The alkylation is effected in the presence of catalysts whereas the dehydrogenation may be catalytic, which is preferred, or simply a noncatalytic thermal dehydrogenation.

One specific embodiment of the present invention, a continuous process for the production of 2-vinylquinoline from quinoline and ethylene, is represented diagrammatically on the accompanying drawing. In this process, ethylene and quinoline are charged at suitable temperature and pressures through conduit or line 1 to an alkylator 2. This alkylator contains a silica-alumina type catalyst or other suitable alkylation catalyst. The quinoline is charged in substantial excess over that which would be required for its complete monoalkylation by the ethylene charged.

The mixture after passing through alkylator 2 is then passed through conduit 3 to separation means indicated diagrammatically by fractionator 4. Uncombined ethylene is discharged through vent 5 or is returned through conduit 6 to alkylator 2. In fractionator 4 a separation is also made between quinoline, ethylquinoline and any polyethylated quinolines. The unethylated quinoline passes back through line 6 to alkylator 2. Ethylquinoline passes through conduit 7 to a furnace 8. Polyalkylated quinolines, which accumulate at the bottom of fractionator 4, are recharged via line 22 to alkylator 2, where they are partially dealkylated in the presence of the excess of quinoline. If desired, part or all of the polyalkylquinolines are recovered through line 21.

The ethylquinoline is heated in furnace 8 to a suitable temperature for dehydrogenation and is then passed through conduit 9 to a dehydrogenator 10 which is charged with a suitable dehydrogenation catalyst. After being subjected to dehydrogenation, the product is passed through conduit 11 to separation means indicated diagrammatically by fractionator 12. In the event that noncatalytic dehydrogenation is to be used, dehydrogenator 10 is omitted and the desired thermal dehydrogenation is effected in furnace 8, which is a tube furnace, or other suitable pyrolysis apparatus, for example, a bath of lead or other molten metal, and the product is charged to fractionator 12.

Hydrogen and any low-boiling products which are formed in the dehydrogenation may be discharged from the fractionator through vent 13. In the fractionator a separation is made between 2-vinylquinoline, which is removed through a discharge outlet 15, and 2-ethylquinoline, which is the overhead and is returned to furnace 8 through conduit 14 for further dehydrogenation.

To prevent polymerization of 2-vinylquinoline during the distillation in fractionator 12, it is generally desirable to add an inhibitor such as sulfur to the material undergoing distillation. The inhibitor may be added at 16. If sulfur is used as inhibitor it will remain in the bottom in fractionator 12 and will be discharged through conduit 15 with 2-vinylquinoline. For the purpose of removing the inhibitor in the 2-vinylquinoline in conduit 15 a flash still 17 may be provided. The inhibitor is discharged through outlet 18 from flash still 17 and the overhead vinylquinoline is recovered at outlet 19. Polymerized vinylquinoline and higher-boiling residual materials may be charged through line 20 to furnace 8 for further pyrolysis. The recovered inhibitor, if relatively free from contaminants, may be reused by charging it to inlet 16 at the top of fractionator 12.

The foregoing process is typical and by suitable substitution may be used for the production of alkenylquinolines generally from olefins and quinoline.

Olefins which may be used for the alkylation to produce the corresponding alkyl-substituted quinolines are ethylene, propylene, 1-butene, 2-butene, isobutylene (2-methyl-1-propene), pentenes, etc.

Instead of starting with quinoline, isoquinoline and substituted quinolines and isoquinolines may be used. For example, 4-methylquinoline may be further alkylated with ethylene according to the process of the invention and then dehydrogenated to give 2-vinyl-4-methylquinoline. If one starts with a quinoline or isoquinoline substituted with an ethyl or higher alkyl group this group may be dehydrogenated in the subsequent dehydrogenation step.

Sulfur has been disclosed herein as an inhibitor of the polymerization of vinylquinoline and other alkenylquinolines. It may be used both in the distillation as described herein, being introduced at the top of fractionator 12, and to inhibit the polymerization of the product on storage, in which event its removal by distillation before use may be required. However, other polymerization inhibitors, for example, alkyl-substituted catechols and similar suitable alkyl-substituted phenols, may be used instead of or in conjunction with sulfur. The amount of inhibitor to be used is largely dependent upon the effectiveness of the inhibitor and upon the degree of inhibition that is desired. Normally, in distillation, to inhibit polymerization, an amount of sulfur within the range of 0.1 to 1 per cent by weight of the material in the column is generally sufficient, although more may be used if desired.

Instead of using a continuous process as described, the various operations may be performed in batchwise manner. Thus the various products may be condensed and reheated without relation to their utilization in a continuous manner.

It is to be understood that the foregoing description is merely exemplary and that in actual operations, pumps, heat exchangers, and other suitable units of equipment which are not illustrated on the drawing will be required. Distillation under reduced pressure, for example, particularly for the separation in fractionator 12, is contemplated and is desirable because of the increased tendency for polymerization of the alkenylquinoline as the temperature is raised. Because the boiling points of alkylquinoline and the corresponding alkenylquinolines are so close to each other, generally not differing by more than approximately 5 or 10° C., fractionating columns of great size (60 plates or thereabouts) are required and the period of sojourn in said columns is rather long. Consequently, for this reason also, it is desirable to maintain as low a distillation temperature as possible. The alkenylquinoline generally has a slightly higher boiling point than the alkylquinoline from which it is derived.

The alkylation of quinoline or alkyl quinolines with olefins is preferably effected in the presence of a silica-alumina type solid contact catalyst in accordance with my invention. Such catalyst may be either a synthetic gel catalyst composite of silica with alumina, or it may be an activated natural clay which is composed essentially of silica and alumina in a form generally believed to be an aluminum silicate with or without substitution of part of the aluminum by a different metal, such as magnesium. The preferred form of activated natural clay is one which may be termed a magnesium substituted hydrogen montmorillonite, one commercially available form of which is sold under the trade-name of "Super-Filtrol."

Suitable synthetic catalysts of the silica-alumina type are those prepared by subjecting partially dried silica gel to the action of a hydrolyzable salt of a metal of group III–B or IV–A of the periodic system. Such catalysts are described by Gayer (Industrial and Engineering Chemistry, 1933, volume 26, page 1122), Perkins et al. (U. S. Patent No. 2,107,710), McKinney (U. S. Patents No. 2,142,324 and 2,147,985), Fulton and Cross (U. S. Patents No. 2,129,649; 2,129,732 and 2,129,733). Chapman and Hendrix (Serial No. 371,209, filed December 21, 1940, now Patent No. 2,342,196), and Hachmuth (Serial No. 370,558, filed December 17, 1940, now Patent No. 2,349,904). A preferred catalyst of this class is prepared by precipitation of hydrous silica gel, by the addition of a sodium silicate solution to a solution of sulfuric acid. The resulting gel is washed with water and then partially dried. The partially dried silica gel is then washed again with water and treated with a solution of aluminum sulfate and again washed. The treatment with aluminum sulfate and washing with water are repeated until sufficient aluminum compound is adsorbed on the gel and the material is thereafter dried, preferably at a temperature not substantially in excess of approximately 225° F.

In general, these catalysts are prepared by first forming a hydrous silica gel or jelly from an alkali-silicate and an acid, washing soluble material from the gel, treating or activating the gel with an aqueous solution of a suitable aluminum salt and subsequently washing and drying the treated material. In this manner, a part of the aluminum presumably in the form of a hydrous oxide or loose hydroxide compound formed by hydrolysis is selectively adsorbed by the hydrous silica and is not removed by subsequent washing. This selective adsorption is attested by a decrease in the aluminum content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. Whether prepared by this method or by some modification thereof, the catalyst will contain a major portion of silica, and a minor portion of alumina. This minor portion of alumina, will generally not be in excess of 10 per cent by weight, and will more often, and generally more preferably, be between about 0.1 and 1.5 or 2 per cent by weight, on the dry basis.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of aluminum, with the sulfate or chloride being preferred. Other alternate salts include acetates and nitrates. The adsorption of the hydrous aluminum oxide by the silica gel proceeds smoothly with hydrated silica gel, whereas with dried silica the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and alumina.

Modifications may be made in the foregoing procedure and catalysts of suitable activity may result. One obvious alternative is the addition of the aluminum salt to the silicate before gelation. This method enables the incorporation of greater proportions of aluminum oxide, but activity may not be proportional to increasing aluminum oxide contents above about 1 to about 15 weight per cent so that little is gained by the modification and the proper degree of salt and acid removal may be more difficult. Non-uniform materials usually result from the mechanical mixing of hydrous aluminum oxide and silica gels, so that catalysts prepared in this manner may be less satisfactory. Other means of accomplishing the preparation may be devised, however, in view of the foregoing description.

As indicated above, the finished gel-type catalysts comprise essentially silica and alumina, with variant quantities of water. The aluminum oxide may be present in minor activating quantities of about 1 to about 15 weight per cent of the total oxides. In many instances catalytic activity may be as great with about 1 to 5 per cent of aluminum oxide as with about 10 to 15 per cent. Still greater amounts up to about 50 weight per cent may be added if desired, although the physical characteristics and activity of the catalyst may be adversely affected. In order to retain the selectivity of the catalyst for the present reaction other heavy metal oxides than those hereinbelow recited, or salts are usually absent from the starting materials and the finished gel. Oxides of metals of group IIIB and IVA of the periodic system may be incorporated with the silica and alumina if desired. For example, small quantities of zirconia may be used in addition to alumina for activating the silica gel. Such metal oxide may be added in the same ways discussed above with respect to aluminum oxide.

The activity of the catalyst prepared by this method is usually enhanced in the present process by a mild dehydration treatment at temperatures of about 200 to about 300° F. just prior to introduction of the reactants. The dehydration is usually accomplished by passing a stream of an inert hydrocarbon or other gas through the catalyst bed at the designated low temperatures. This dehydration may, of course, be accomplished gradually during operation through the agency of the feed mixture, but an initial period of somewhat low conversion may result. Prior to this step, drying temperatures in the catalyst preparation procedure are not usually higher than subsequent initial operating temperatures.

The type of activated natural clay catalyst preferred for effecting the alkylation of the present invention is that known as "Super-Filtrol," described in an article by Davidson et al. at pages R–318 to R–321 of "National Petroleum News," issue of July 7, 1943. This material occurs in nature—before activation—as montmorillonite, which is believed to have the ideal formula $Al_2Si_4O_{10}(OH)_2nH_2O$. However, since in nature the ideal formula is not realized due to substitutions, it has an actual formula approximating

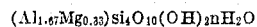

wherein the arrow indicates that the external exchangeable ion is essentially a result of incomplete charge in the positions having octahedral co-ordination; see Hendricks, "Journal of Geology," vol. 50, 276–290 at page 287 (1942), cited by Davidson et al., at page R–318 in their above-mentioned article in "National Petroleum News." The natural montmorillonite clay has a crystalline rather than an amorphous or gel structure, as exemplified by silica gel. One apparently typical substitution in the formula of the product as found in nature is partial replacement of aluminum by magnesium. This montmorillonite mutation does not appear to be haphazard, but characteristically every sixth aluminum ion is apparently supplanted by a magnesium ion, and this replacement of a trivalent cation (aluminum) by a divalent cation (magnesium) is believed to give rise to a deficiency in positive charge. The crystal lattice of the ideal montmorillonite unit crystal cell is characterized by a layer configuration, and each layer is believed to consist of four sheets of oxygen, between the outer sheets of which in the tetrahedral position are located the silicon atoms; in the octahedral position are the aluminum atoms, and in the same oxygen sheets which form the boundaries of the octahedrals are the hydroxyl ions. The deficiency in positive charge caused in the neutral product by the replacement of the trivalent cation by the divalent cation causes the lattice to become negatively charged, and in order to neutralize this charge, various types of cations are adsorbed on the crystal protruding into the water of hydration space between the layers of montmorillonite. The cations, being exposed, are subject to mass action effects and are readily replaceable, thus giving rise to the phenomenon of base exchange which is a characteristic of the substituted montmorillonite.

The raw montmorillonite clay is commonly classified as a non-swelling bentonite and is sometimes referred to as a subbentonite.

Modification of the raw montmorillonite to provide a suitable catalyst for the present invention is effected by activation. The most common form of activation is by means of an acid, and in treating a magnesium substituted montmorillonite in the raw form for use as a catalyst by acid activation, impurities are removed with attendant increase in effective catalytic surface, and also exchangeable ions are replaced by hydrogen: i. e., the surface cations originally present in a magnesium substituted montmorillonite lattice are replaced by hydrogen ions as a result of the activation. Thus, the activated material may be termed a magnesium substituted hydrogen montmorillonite. A further effect of the acid treatment in activating the montmorillonite clay may well be to dissolve a disproportionate amount of alumina, thus increasing the percentage of magnesia. A sample of the activated montmorillonite clay is characterized by the following analysis:

| | Per cent by weight |
|---|---|
| Magnesia | 4.9 |
| Alumina | 14.4 |
| Water | 21.9 |
| Silica | Remainder |

The catalyst is of the solid contact type and is preferably used in this invention in the form of pellets ranging in size from four to twenty mesh. Ten grams of this particular material in the form of 4–8 mesh pellets were washed with 50 cc. of distilled water, whereupon the wash water acquired a pH of 3.0. It is obvious that the above analysis of the particular percentages of magnesia, alumina, silica, and water will vary within reasonable limits, depending on various factors, such as the source of the clay, the extent and character of the acid treatment, and other factors.

As will be shown hereinbelow, synthetic and natural catalysts of the foregoing nature, designated herein as silica-alumina type catalysts, have no activity towards the alkylation of pyridine. It is quite surprising therefore, and wholly unexpected, that quinoline can be alkylated with these catalysts at conditions identical with those giving no alkylation of pyridine. While per pass yields are not high, this is not unusual in alkylation reactions, and by recycling unreacted quinoline entirely satisfactory ultimate yields of alkyl quinolines are realized.

In addition to the novel alkylation reaction, my invention also comprehends a novel process whereby quinoline or a derivative thereof and an olefinic hydrocarbon as starting materials are converted into the corresponding alkenyl quinoline in a two-step integrated process involving first an alkylation forming an alkylquinoline followed by dehydrogenation of same to form the desired alkenyl-quinoline end product. Preferably the silica-alumina type catalysts described are used for the alkylation. However, the alkylation may, if desired, be conducted in the presence of other solid contact catalysts, such, as for example, acid catalysts composed of or consisting of phosphoric acid or phosphorus pentoxide deposited on a granular solid supporting material may also be employed. Solid catalysts of the silica-alumina or other type may and preferably are used under vapor-phase conditions of operation and generally within the temperature range of approximately 400° to approximately 700° F. However, alkylation in the liquid phase at lower temperatures, for example 0 to 250° F., may be adopted with catalysts such as phosphoric acid, sulfuric acid, anhydrous hydrogen fluoride, boron trifluoride, and hydrogen fluoride containing boron fluoride. Such catalysts are not generally preferred, however, because when using these latter acid catalysts, provision must be made for maintaining sufficient pressure to obtain liquid-phase reaction conditions and also for decomposing any acid compounds which are formed in the reaction. Thus, on alkylating quinoline with ethylene in the presence of a large excess of hydrogen fluoride, some of the quinoline and ethylquinoline will be converted to quinoline hydrofluoride and ethylquinoline hydrofluoride, in which event, decomposition of such salts, generally by means of alkali, will be required before proceeding with the dehydrogenation thereof.

Catalysts suitable for the vapor-phase dehydrogenation of alkylquinolines to alkenylquinolines include chromium oxide and molybdenum oxide, which may be used alone or supported on suitable catalyst carriers. A preferred catalyst is unglowed chromium oxide supported on alumina or bauxite. Other suitable catalysts are thorium oxide on alumina. An especially advantageous catalyst is one containing chromium oxide together with calcium oxide or other alkaline-earth-metal oxide and/or an alkali-metal oxide or hydroxide, or one such as is described in Corson and Cox Patent No. 2,311,979. Other suitable chromium oxide catalysts are described in the patent of Morey and Frey (No. 2,270,887), Matuszak (No. 2,294,414), Grosse (No. 2,172,534), Hupke and Frey (No. 1,905,383 and 2,098,959), and Visser and Engel (No. 2,249,337).

The dehydrogenation is preferably conducted under reduced pressure. This may be accomplished by operating in vacuo, or by diluting the reactants with an inert gas such as nitrogen, steam, or carbon monoxide.

The temperatures which are used for the dehydrogenation are generally within the range of approximately 800° to approximately 1200° F. and preferably between 900° and 1100° F. As previously stated, low dehydrogenation temperatures may be used when catalysts are employed to facilitate the reaction.

The reaction mixture which is charged to the alkylator should contain a molecular excess of quinoline over olefin. Preferred ratios are within the range of 3 mols of quinoline to 1 mol of olefin to 6 mols of quinoline to 1 mol of olefin. The particular ratio which is most suitable for use with a particular olefin will depend to a great extent on the reactivity of the olefin and the particular alkylation reaction conditions. With ethylene, for example, a higher molecular ratio of quinoline to ethylene would be more desirable than with isobutylene.

As an example of the practice of the process of this invention, the following preparation of 2-vinylquinoline, which is a batchwise operation, is cited: Quinoline and ethylene are charged to a chamber containing a silica-alumina catalyst prepared according to the general method hereinabove described. The molecular ratio of quinoline to ethylene is 5 to 1 and the materials are heated to such temperature that the temperature of the catalyst bed is approximately 700° F. The products are condensed and then fractionally distilled. The quinoline (boiling range approximately 230° to 238° C.) is separated from the 2-ethylquinoline (boiling range approximately 250° to 258° C.).

Ethylquinoline as obtained above is then heated to a temperature of approximately 1000° F. by passing it through a tube and it is then passed through a tube containing a chromium oxide catalyst supported on bauxite. The vapors are condensed and distilled fractionally in a 6-foot glass column packed with glass helixes to separate the undehydrogenated 2-ethylquinoline from 2-vinylquinoline.

Substantial yields of 2-ethylquinoline and 2-vinylquinoline are obtained, although the conditions specified in the foregoing example are not to be understood to be optimum conditions.

Although I have referred herein to the production of 2-alkenylquinoline, and specifically to the production of 2-vinylquinoline, I am not as yet certain that this is the exact constitution of my products, that is, that the substituent is on the 2 or alpha carbon atom of the quinoline nucleus. The properties of the 2-vinylpyridine obtained by my process conform in general to the physical properties of the products described in the published art. It is quite likely that the crude product from the reaction of quinoline and ethylene contains ethylquinolines in which the ethyl group is present on other carbon atoms of the quinoline nucleus. Furthermore, when propylene and higher olefins are used as alkylating agents it is even more likely that the product is a mixture of isomers in which perhaps the 2 or alpha alkyl isomer is predominant and the 4 or gamma alkyl isomer is second in predominance, although this will depend to a large extent on the specific reaction conditions used. It is not to be understood, therefore, that the invention is limited otherwise than as described or claimed.

2-vinylquinoline and other alkenylquinolines which can be obtained by the process of the present invention may be readily polymerized to products which are useful as plastics and which can be molded under heat and pressure and which are thermoplastic as contrasted to thermosetting plastic materials. They are also useful in the form of copolymers with 1,3-butadiene (erythrene), isoprene (2-methyl-1,3-butadiene) and piperylene (1,3-pentadiene), respectively, as "synthetic rubbers," namely, products which possess a high elasticity and resemble natural rubber in other respects. Such copolymers even surpass natural rubber in some properties.

The mono- and poly-alkyl quinolines, obtained by the alkylation of this invention, in addition to being intermediates in the two-step synthesis of alkenyl quinolines described, find utility in pharmaceutical and other fields, and are intermediates in synthesis of quinoline carboxylic acids such as quinaldinic acid, drugs, dyes, and the like.

As used herein and in the claims, it is to be understood that the general term quinoline refers to both quinoline and isoquinoline.

Suitable flow rates for both the alkylation and dehydrogenation reactions are readily determined by trial, and are generally within the range of 0.1 to 10 liquid volumes total charge per volume catalyst per hour. Space velocities of from 0.5 to 5 vol./vol./hour are ordinarily preferred for the alkylation, while higher rates of say 2 to 10 vol./vol./hour are more suitable for the dehydrogenation.

The following data show the alkylation of quinoline with propylene over a synthetic silica-alumina gel catalyst, and over a magnesium hydrogen substituted montmorillonite catalyst, as well as the failure of these catalysts to effect alkylation of pyridine and alpha methyl pyridine (2-picoline) under similar conditions.

The catalyst case was a heavy one-inch steel pipe approximately 17 inches long with a welded jacket made of three-inch pipe. The jacket was connected at the top and bottom to a reservoir made of two-inch pipe.

The jacket and reservoir were filled with "Dowtherm A" which was continuously circulated by a propeller-type agitator immersed in the "Dowtherm" reservoir. The "Dowtherm" was heated electrically by means of resistance wire wound on the reservoir, and the temperature was continuously adjusted by a micromax controller. A thermocouple well was concentrically located in the catalyst case to follow the reaction temperature, and another was located in the jacket to permit control of the bath temperature.

The charge was made up in a pressure cylinder and pumped to the reactor by a metering pump. Nitrogen pressure was maintained in the charge cylinder. An indicating pressure controller held the system pressure at 1000 p. s. i. g. by actuating a motor value on the downstream side of the catalyst case. The effluent was discharged through a water cooled glass condenser to a glass graduate which served as an accumulator. This receiver was vented to a Dry Ice-acetone cooled trap to condense any unreacted propylene.

The run A reported in Table I below was an attempt to effect alkylation in a reaction mixture consisting of propylene, toluene, and pyridine. Other runs not reported in detail here showed that at the conditions of Table I but in the absence of pyridine, toluene was readily alkylated.

TABLE I

*Attempted alkylation of mixed pyridine and toluene*

|  | Run A |
|---|---|
| Catalyst (8-20 mesh) | Super-Filtrol |
| Catalyst volume, ml | 150 |
| Pressure, p. s. i. g | 1,000 |
| Temperature, °F | 337-373 |
| Space Velocity, Liq. Vol. Charge/Vol. Cat./Hour | 2.13 |
| Material Charged, grams: |  |
| Pyridine | 457.9 |
| Toluene | 2736.7 |
| Propylene | 230.1 |
| Mol Ratios: |  |
| Pyridine:Propylene | 1.06 |
| Toluene:Propylene | 5.45 |
| Material Recovered, grams Distillation in Large Column: |  |
| Propylene | 85. |
| Toluene and Pyridine | 3210.4 |
| Residue | 43.1 |
| Loss | 86.2 |
| Distillation in Small Column of 39.9 g. of the Residue from Large Column: |  |
| Toluene and Pyridine | 29.5 |
| Cymenes and Propyl Pyridines | None |
| Residue (apparently propylene polymer) | 8.7 |
| Loss | 1.7 |

TABLE II

*Attempted alkylation of 2-picoline (alpha-methyl pyridine)*

|  | Run B | Run C |
|---|---|---|
| Catalyst (8-14 mesh) | Silica-Alumina Gel | Silica-Alumina Gel |
| Catalyst Volume, ml | 105 | 105 |
| Pressure, p. s. i. g | 1,000 | 1,000 |
| Temperature, °F.: |  |  |
| Inlet | 352-378 | 600-630 |
| Outlet | 350-360 | 580-618 |
| Space Velocity, Liq. Vol. Charge/Vol. Cat./Hour | 1.1 | 1.05 |
| Material Charged, grams: |  |  |
| 2-Picoline | 383 | 381.6 |
| Propylene | 84 | 104.4 |
| Mol Ratio: |  |  |
| Picoline:Propylene | 2.06 | 1.67 |
| Material Recovered, grams: |  |  |
| Propylene | 72.8 | 72.0 |
| 2-Picoline | 375.9 | 345.0 |
| Alkylated picolines | None | None |
| Loss | 18.3 | 69 |

TABLE III

*Alkylation of quinoline with silica-alumina gel*

|  | Run D | Run E |
|---|---|---|
| Catalyst (14-20 mesh) | Silica-Alumina Gel | Silica-Alumina Gel |
| Catalyst Volume, ml | 125 | 125 |
| Pressure, p. s. i. g | 1,000 | 1,000 |
| Temperature, °F | 597-607 | 592-615 |
| Space Velocity, Liq. Vol. Charge/Vol. Cat./Hour | 0.94 | 0.93 |
| Material Charged, grams: |  |  |
| Quinoline | 530 | 548 |
| Propylene | 41 | None |
| Mol Ratio, Quinoline:Propylene | 4.2 |  |
| Material Recovered, grams: |  |  |
| Propylene | 36.4 |  |
| Quinoline | 475.2 | 526.7 |
| (a) Material Boiling 124-137° C. at 20 mm | 4.7 |  |
| (b) Material Boiling 137-154° C. at 20 mm | 4.0 |  |
| (c) Material Boiling above 154° C. at 20 mm. (Partly Tar) | 3.6 |  |
| Tar | 44.7 | 12.4 |
| Loss | 2.4 | 8.9 |
| Nitrogen Analysis, weight percent: |  |  |
| Fraction (a) | 10.03; 9.94 |  |
| Fraction (b) | 8.10; 8.29 |  |
| Theoretical for Isopropylquinoline | 8.2 |  |
| Theoretical for Quinoline | 10.8 |  |
| Yield, grams: |  |  |
| Isopropylquinolines |  |  |
| 30% (a) | 1.4 |  |
| 100% (b) | 4.0 |  |
| 33% (c) (Probably some diisopropylquinolines) | 1.2 |  |
| Total | 6.6 |  |
| Yield, Mol Per Cent Based on Propylene Charged Isopropylquinolines: |  |  |
| Per Pass | 4.0 |  |
| Ultimate | 35.2 |  |

TABLE IV

*Alkylation of quinoline with super-filtrol*

|  | Run F |
|---|---|
| Catalyst (14-20 mesh) | Super-Filtrol |
| Catalyst Volume, ml | 125 |
| Pressure, p. s. i. g | 1000 |
| Temperature, °F | 605-615 |
| Space Velocity, Liq. Vol. Charge/Vol. Cat./Hour | 1.10 |
| Material Charged, grams: |  |
| Quinoline | 198 |
| Propylene | 15 |
| Mol Ratio, Quinoline:Propylene | 4.29 |
| Material Recovered, grams: |  |
| Propylene | 9.1 |
| Quinoline | 126.0 |
| (a) Material Boiling 126-137° C. at 20 mm | 9.7 |
| (b) Material Boiling 137-165° C. at 20 mm | 2.5 |
| (c) Material Boiling 165-220° C. at 20 mm | 1.0 |
| Tar | 61.2 |
| Loss | 3.5 |
| Nitrogen Analysis, weight percent: |  |
| Fraction (b) | 6.73 |
| Theoretical for Diisopropylquinoline | 6.6 |
| Yield, grams: |  |
| Isopropylquinolines (a) | 9.7 |
| Diisopropylquinolines (b) and (c) | 3.5 |
| Yield, Mol Per Cent Based on Propylene Charged— |  |
| Isopropylquinolines: |  |
| Per Pass | 15.9 |
| Ultimate | 40.4 |
| Diisopropylquinolines: |  |
| Per Pass | 9.2 |
| Ultimate | 23.4 |

Run E in Table III above was a control run made without propylene. Distillation of the product showed no material boiling above quinoline except for a heavy tar. Inasmuch as the boiling points of the various isopropylquinolines and diisopropylquinolines overlap to some extent, nitrogen analyses as well as boiling ranges have been used in approximating the proportioning of products reported in Tables III and IV.

At the pressures and temperatures employed in runs A to F, essentially liquid phase or at least mixed phase conditions obtained within the reactor. It will be appreciated, of course, that the particular combinations of reaction conditions employed are not necessarily optimum. Also, various supplementary or alternative procedures, for example, the use of hydrocarbon or other diluents in the reaction mixture, may be used without departing from the invention in its broader aspects. While ordinarily temperatures from 400 to 700° F. are used in the alkylation with silica-alumina type solid contact catalyst, somewhat lower or higher temperatures, such as down to 350° F. or up to 850° F., are permissible depending on the activity and selectivity of the particular catalyst composition.

This application is a continuation-in-part of my copending application Serial No. 511,894, filed November 26, 1943, now abandoned.

I claim:

1. A process for the production of an alkenylquinoline which comprises alkylation of quinoline with an olefin hydrocarbon in the presence of a solid alkylation catalyst of the silica-alumina type at a temperature within the range of approximately 400° to approximately 700° F. to produce an alkylquinoline and dehydrogenation of the resulting alkylquinoline in the presence of a solid dehydrogenation catalyst at a temperature within the range of approximately 800° to approximately 1200° F. to produce an alkenylquinoline.

2. A process as defined in claim 1 in which the dehydrogenation catalyst is a catalyst containing chromium oxide.

3. A process for the production of a 2-alkenylquinoline which comprises dehydrogenating the corresponding 2-alkylquinoline in the presence of a solid dehydrogenation catalyst at a temperature within the range of from 800 to 1200° F. and thereby converting the 2-alkylquinoline to the corresponding 2-alkenylquinoline.

4. A process which comprises subjecting a mixture of a quinoline and an olefin to reaction in the presence of a silica-alumina type catalyst, and recovering a thus-produced alkylated derivative of said quinoline.

5. A process which comprises contacting a mixture of quinoline and an olefin with a silica-alumina type solid contact catalyst to produce an alkylquinoline, and recovering an alkylquinoline so produced.

6. A process as defined in claim 5 in which said olefin is propylene.

7. A process as defined in claim 5 in which said catalyst is a synthetic silica-alumina gel.

8. A process as defined in claim 5 in which said catalyst is one prepared by forming a hydrous silica gel, washing same, activating the washed gel with an aqueous solution of a hydrolyzable salt of aluminum, and subsequently washing and drying the thus treated material.

9. A process as defined in claim 5 in which said catalyst is a magnesium substituted hydrogen montmorillonite.

10. A process as defined in claim 5 in which a stoichiometric excess of quinoline over olefin is used.

11. A continuous process for the production of an alkenylquinoline which comprises passing a mixture of an olefin hydrocarbon and quinoline comprising quinoline in molecular excess into contact with a solid alkylation catalyst of the silica-alumina type at a tempearture within the range of approximately 400° to approximately 700° F., recovering unreacted quinoline and recharging it together with additional amounts of olefin hydrocarbon to the alkylation catalyst, separating alkylated quinoline from the alkylation reaction product and subjecting it to dehydrogenation in the presence of a solid dehydrogenation catalyst at a temperature within the range of approximately 800° to approximately 1200° F., separating undehydrogenated alkylquinoline from the product of the dehydrogenation reaction and recharging it to the dehydrogenation catalyst, and separating and recovering the alkenylquinoline from the product of the dehydrogenation reaction.

12. A process for the formation of an alkylquinoline which comprises subjecting a mixture of an olefin containing not over six carbon atoms and a stoichiometric excess of a quinoline selected from the group consisting of quinoline and isoquinoline and their alkyl derivatives, to alkylation temperature within the range of 400 to 700° F. in contact with a silica-alumina type catalyst for a time effective to form an alkylquinoline corresponding to said olefin and said quinoline.

13. A process as defined in claim 12 in which said olefin is propylene, said quinoline is quinoline, and said catalyst is a magnesium substituted hydrogen montmorillonite.

14. A process for the production of an alkenylquinoline which comprises contacting a mixture of quinoline and an olefin with an alkylation catalyst of the silica-alumina type to produce an alkylquinoline, and subjecting the resulting alkylquinoline to dehydrogenation conditions to produce the corresponding alkenylquinoline.

15. A process for the production of 2-vinylquinoline which comprises contacting a mixture of quinoline and ethylene with an alkylation catalyst of the silica-alumina type to produce 2-ethylquinoline, and subjecting the resulting 2-ethylquinoline to dehydrogenation conditions to produce 2-vinylquinoline.

16. A process for the production of an alkenylquinoline which comprises subjecting an alkylquinoline having at least two carbon atoms in an alkyl group to dehydrogenation conditions to produce the corresponding alkenylquinoline.

CARY R. WAGNER.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,300,971 | Roberts et al. | Nov. 3, 1942 |
| 2,410,111 | Thomas | Oct. 29, 1946 |

FOREIGN PATENTS

| Number | Country | Date |
|---|---|---|
| 115,967 | Australia | Sept. 30, 1942 |

OTHER REFERENCES

Sidgwick, "Organic Chemistry of Nitrogen," (Oxford University Press; New York, 1937), pages 522, 523, 542, 543, and 549.